US009486871B2

(12) United States Patent
Giffels et al.

(10) Patent No.: US 9,486,871 B2
(45) Date of Patent: Nov. 8, 2016

(54) METHOD FOR PRODUCING A HEATING ROD

(71) Applicant: BorgWarner BERU Systems GmbH, Ludwigsburg (DE)

(72) Inventors: Thomas Giffels, Stuttgart (DE); Ralph Waechter, Pfinztal (DE); Michael Luppold, Dettenheim (DE); Alexander Dauth, Maulbronn (DE); Klaus Lehmann, Oberderdingen (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 488 days.

(21) Appl. No.: 14/011,090

(22) Filed: Aug. 27, 2013

(65) Prior Publication Data
US 2014/0061174 A1   Mar. 6, 2014

(30) Foreign Application Priority Data

Aug. 29, 2012 (DE) .......... 10 2012 107 985

(51) Int. Cl.
H05B 3/00 (2006.01)
B23K 9/00 (2006.01)
H05B 3/24 (2006.01)

(52) U.S. Cl.
CPC .......... *B23K 9/0008* (2013.01); *H05B 3/24* (2013.01); *H05B 2203/017* (2013.01); *H05B 2203/02* (2013.01); *H05B 2203/023* (2013.01)

(58) Field of Classification Search
CPC .............. Y10T 29/49083; H05B 3/48; H05B 2203/017; H05B 2203/02; H05B 3/44; F24H 9/1872; F24H 9/2071
USPC ......... 29/611, 890.045, 890.053; 219/137 R, 219/202, 505, 520, 530, 537, 544
See application file for complete search history.

(56) References Cited

U.S. PATENT DOCUMENTS

| 4,698,614 A | * | 10/1987 | Welch | H01C 1/02 219/544 |
| 5,172,476 A | * | 12/1992 | Joshi | B21C 37/151 228/183 |
| 7,977,610 B2 | | 7/2011 | Hamburger et al. | |
| 2009/0139983 A1 | | 6/2009 | Luppold et al. | |

FOREIGN PATENT DOCUMENTS

| CN | 200950674 Y | 9/2007 |
| CN | 201550302 U | 8/2010 |
| EP | 1 467 599 A2 | 10/2004 |
| WO | WO 2007/071335 A1 | 6/2007 |

* cited by examiner

*Primary Examiner* — Thiem Phan
(74) *Attorney, Agent, or Firm* — Bose McKinney & Evans LLP

(57) ABSTRACT

This disclosure relates to a method for producing a heating rod for a vehicle heating apparatus, said method comprising the following steps: arranging at least one PTC element and at least one contact element in a tube, which is formed from sheet metal and is open along a longitudinal side; welding portions of the sheet metal that bear against one another by means of a weld seam running in the longitudinal direction of the tube. This disclosure also relates to such a heating rod.

12 Claims, 2 Drawing Sheets

METHOD FOR PRODUCING A HEATING ROD

RELATED APPLICATIONS

This application claims priority to DE 10 2012 107 985.4, filed Aug. 29, 2012 which is hereby incorporated by reference in its entirety.

BACKGROUND

WO 2007/071335 A1 discloses a vehicle heating apparatus that comprises a plurality of heating rods. Each heating rod comprises a housing tube that is an extruded profile. PTC elements are arranged in the housing tube and are held by a frame together with a contact plate. Once the PTC elements and the contact plate have been inserted into the frame, the housing tubes are pressed, thus achieving good thermal coupling between the housing tubes and the PTC elements. An advantage of heating rods of this type is that the individual components are protected by the housing tube and heat generated by the PTC elements can be dissipated well by the housing tube.

SUMMARY

The present invention presents a way in which heating rods comprising a housing tube can be produced more cost effectively.

According to this disclosure, the housing tube is produced cost effectively from sheet metal. Instead of inserting a PTC element and other components into the housing tube, the housing tube is constructed around the PTC element or the PTC elements. To this end, an assembly containing at least one PTC element and at least one contact element is covered all around with sheet metal and a tube is then formed by welding sheet metal portions that are bearing against one another.

For example, the assembly can be arranged between two half shells, which are then welded together in order to form a housing tube. The assembly may also be arranged in a tube that is open on its longitudinal side, said tube being formed from a sheet metal and being open on a longitudinal side. A further possibility is to wind sheet metal around the assembly and to then weld sheet metal portions that are bearing against one another. During the winding process, sheet metal portions may overlap, and then overlapping sheet metal portions can be welded to one another. Edges of the sheet metal that contact one another can also be welded to one another in order to produce a tube.

Housing tubes produced from sheet metal are much more cost effective than extruded profiles. In addition, a separate fabrication step in the form of a pressing operation is not necessary. When closing and welding the tube, a resilient force can be exerted onto the assembly, such that a separate pressing operation with plastic deformation of the tube is not necessary.

When the assembly is inserted into the tube, the inner cross section of the tube, which is still open on its side, is greater than the cross section of the assembly. The assembly can therefore be inserted without difficulty. Only when the tube is closed is a resilient force exerted onto the assembly. To this end, one or more walls of the tube can be curved inwardly. After welding, the tube would have a lower free internal height compared to the inserted assembly with the PTC resistor, such that an inwardly curved wall presses resiliently against the assembly and thus ensures good electrical and thermal contact. Whereas conventional heating rods with tube housings formed from extruded profiles have to be pressed in a separate fabrication step, this is not necessary in the case of a heating rod according to this disclosure. In order to improve the contact, the tube of a heating rod according to this disclosure can be pressed at its edges after the welding process. A relatively low force is sufficient for this purpose however.

The two ends of the housing tube can remain open. By folding or bending over sheet metal portions and subsequent welding, an end of the housing tube or even both ends can be closed.

The housing tube can be formed for example as a flat tube, in particular as a square tube. Here, it is preferable for an inwardly curved wall of the housing tube to bear against an insulation layer that electrically insulates a contact element from the housing tube. With the inwardly curved wall, a bias can be produced, by means of which the housing tube presses against the components arranged therein. Good thermal coupling between the housing tube and the PTC element or the PTC elements can thus advantageously be ensured. The opposed wall of the housing tube may be planar or may likewise have a curvature.

In an advantageous refinement of this disclosure, the sheet metal strip from which the housing tube is formed forms at least one cooling element since at least one portion of the sheet metal strip, which starts from the weld seam, extends from the tube. A sheet metal strip portion, which stands away from the housing tube and forms a cooling element, preferably starts from the weld seam on opposite sides. In order to form a housing tube with integrated cooling elements, a sheet metal strip can be bent into a tube, and the longitudinal edges of the sheet metal strip can be bent back such that the bending edges of the bent-back edge portions contact one another. The two bending edges bearing against one another are then welded to one another and the tube is thus closed along the side. A portion of the sheet metal strip protruding from the tube then starts from each bending edge and forms a cooling element. It is of course also possible for just a single cooling element to start from the weld seam, specifically if a longitudinal edge of the sheet metal strip is welded to a bending edge, from which a protruding portion of the sheet metal strip starts.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
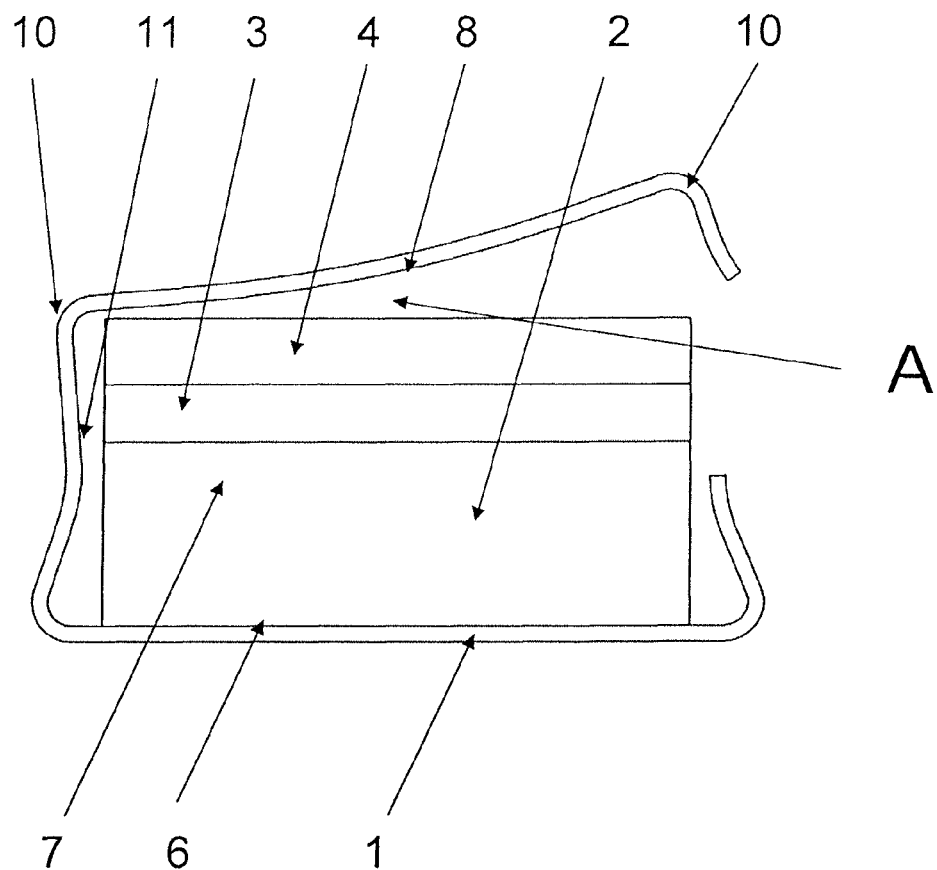
FIG. 1 shows a fabrication step during the production of an illustrative embodiment of a heating rod according to this disclosure.

FIG. 1 illustrates the production of a heating rod for a heating apparatus of the passenger compartment of a motor vehicle. This heating rod is illustrated in the figure in a schematic cross-sectional view. The heating rod has a housing tube 1, which surrounds a PTC element 2, a contact element 3 and an insulation layer 4. The heating rod is produced by forming an assembly comprising at least one PTC element 2, at least one contact element 3 and at least one insulation layer 4. The assembly is then arranged in a tube formed from sheet metal, said tube being open along a longitudinal side. An example of this is illustrated schematically in FIG. 1. For production of the heating rod, a preformed sheet metal strip can be used, wherein the four edges of the housing tube are already formed by bends of the sheet metal strip.

The assembly may also be arranged in a tube that is open along two longitudinal sides, that is to say for example in a tube that is formed by two half shells fitted together.

Portions of the sheet metal bearing against one another are then welded to one another, and the housing tube 1 thus formed is therefore closed along the side(s). The housing tube 1 therefore has a weld seam 5 extending in its longitudinal direction.

When the assembly is inserted into the tube, the inner cross section A of the open tube is greater than the cross section of the assembly. The assembly can therefore be inserted without difficulty. Only when the tube is closed is a resilient force exerted onto the assembly.

Figure 2:
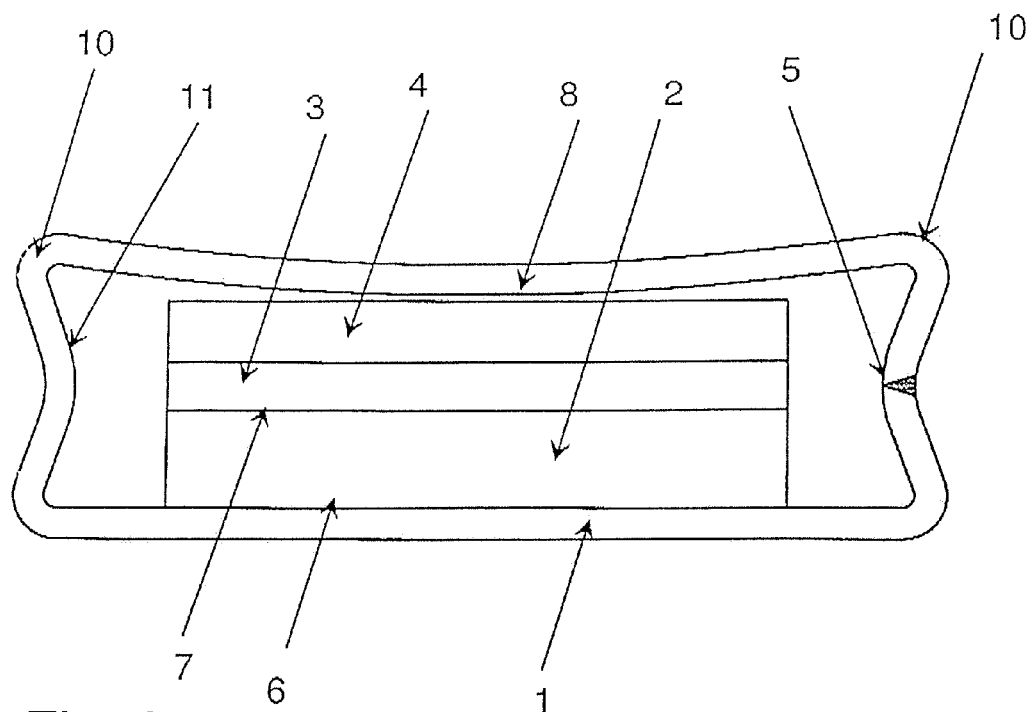
FIG. 2 shows a schematic cross-sectional view of an illustrative embodiment of a heating rod according to this disclosure.

The portions of the sheet metal strip bearing against one another may overlap or contact one another at their longitudinal edges, as is illustrated in FIG. 2. The weld seam 5 may be a continuous weld seam or may consist of individual weld points, which are arranged at a distance from one another.

The heating rod may contain any number of PTC elements 2. The PTC elements 2 are preferably ceramic PTC elements, for example based on barium titanate. Due to the use of PTC elements as heating resistors, a protection against overheating can advantageously be achieved. For example, a sheet metal strip can be used as a contact element 3.

The assembly containing at least one PTC element 2 can be preassembled with a frame (not shown in FIG. 1) to form a unit that can be easily handled. Such a frame is preferably made of plastic. One or more PTC elements 2 can be clamped in a frame. For this purpose, the frame may comprise clamping lugs for example. The frame can be fastened to the contact element 3, for example slid over the contact element 3 or injection moulded around the contact element 3. Suitable frames are known for example from EP 1 467 599 A2 which is incorporated by reference.

In the case of the illustrated heating rod, the PTC element 2 is only contacted on its upper face 7 by a contact element 3. The lower face 6 of the PTC element 2 is contacted by the housing tube 1. Alternatively, two contact elements 3 can also be used however, which are both electrically insulated with respect to the housing tube 1 by means of an insulation layer 4, and between which the PTC element 2 or the PTC elements 2 is/are arranged.

The housing tube 1 is a flat tube. At its ends, the housing tube may remain open or may be closed by a closure element, for example a stopper. It is also possible to close one end of the housing tube by bending over or folding and welding sheet metal portions.

The weld seam 5 is located in the example illustrated in FIG. 2 on a narrow side of the housing tube 1, but can also be arranged on a broad side however. The weld seam 5 preferably runs parallel to edges of the housing tube 1.

The housing tube 1 may have one or more curved side walls. For example, the insulation layer 4 may bear against an inwardly curved side wall 8. A bias can thus be produced, by means of which the housing tube 1 presses against the insulation layer 4. Good thermal coupling between the housing tube 1 and the PTC element 2 can thus advantageously be achieved. The opposite side wall is planar in the illustrated illustrative embodiment, but can also be curved inwardly. The bias can be increased if, in addition to the broad side 8, the two narrow sides 11 of the housing tube 1 are also curved inwardly.

A curvature in a side wall 8, 11 of the housing tube 1 can be produced for example if, as the sheet metal strip is bent into a tube, the sheet metal strip is also impressed between bending points that later form edges of the housing tube 1. When the portions bearing against one another are welded to one another, the side walls 8, 11 are then already indented. The curvature of the side wall 8 is reduced here by pressing against the insulation layer 4, such that an advantageously large contact area is produced, via which heat can be efficiently dissipated. Alternatively, a plurality of curvatures arranged side by side can also be provided on a side wall.

In the case of the finished heating rod, the side wall 8 of a broad side of the tube presses resiliently against the assembly with the PTC element 2 and thus ensures good electrical and thermal contacting of the PTC element. In order to improve this contacting and to increase the force with which the side wall 8 presses against the assembly, the housing tube 1 can be pressed at its edges 10.

Figure 3:
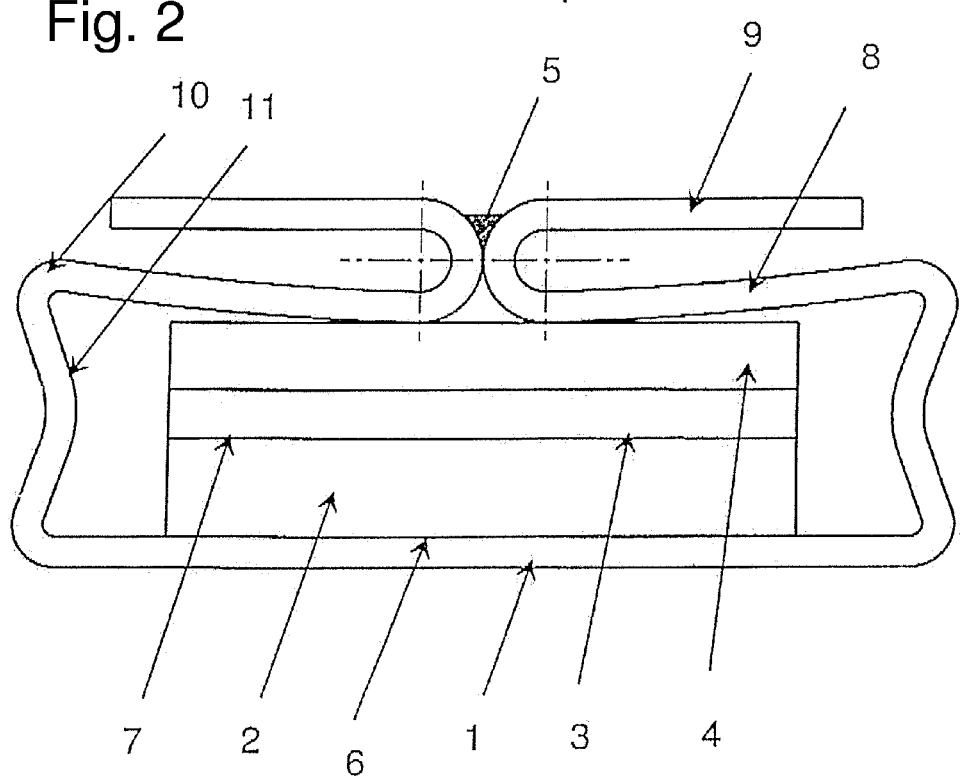
FIG. 3 shows a schematic cross-sectional view of a further illustrative embodiment of a heating rod according to this disclosure.

FIG. 3 shows a further illustrative embodiment of a heating rod, which basically differs from the above-described heating rod merely in that the sheet metal strip from which the housing tube 1 is formed additionally also forms two cooling elements 9. The two longitudinal edges of the sheet metal strip from which the housing tube 1 is formed are bent back and the corresponding bending points are welded by means of the weld seam 5. An edge portion of the sheet metal strip therefore starts from the weld seam 5 on either side. As shown in FIG. 3, this edge portion protrudes from the housing tube 1 such that a fluid to be heated flows over said edge portion and said edge portion can dissipate heat to said fluid.

It is advantageous here if, before welding, the two limbs of the side wall have a separate inner curvature. When joining together and welding the limbs, these are pressed against the assembly containing the PTC resistor, and each limb of the side wall presses resiliently against the assembly.

In the example shown in FIG. 3, the weld seam 5 is arranged on a broad side of the housing tube 1. The weld seam 5 with the cooling elements 9 starting therefrom can also be provided however on a narrow side of the housing tube.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for producing a heating rod, said method comprising the following steps:
arranging at least one PTC element and at least one contact element in a housing tube, which is formed from sheet metal and is open along a longitudinal side;
forming inwardly curved narrow sides of the housing tube;
welding portions of the sheet metal that bear against one another by means of a weld seam running in the longitudinal direction of the housing tube; and
forming at least one cooling element starting at the weld seam.

2. The method according to claim 1, wherein the weld seam runs continuously from one end of the housing tube to the other end of the tube.

3. The method according to claim 1, wherein the contact element is a sheet metal strip, which, via a front face, bears against the PTC element and, on its rear face, bears against an insulation layer.

4. The method according to claim 1, wherein the sheet metal is bent on two sides to form the housing tube and at least one longitudinal edge section of the sheet metal is bent away from an opposing edge section to from a cooling element protruding away from the housing tube.

5. The method according to claim 1, wherein the housing tube is joined together from two half shells.

6. The method according to claim 1, wherein the housing tube is formed from the sheet metal by bending an edge portion of the sheet metal towards an opposed edge portion.

7. The method according to claim 1, wherein the housing tube is formed as a flat tube.

8. The method according to claim 1, wherein the housing tube is formed to have an inwardly curved side wall, which bears against an insulation layer.

9. The method according claim 1, wherein the housing tube is formed to have inwardly curved narrow sides.

10. The method according to claim 1, further comprising closing the open longitudinal side of the housing tube before the step of welding.

11. A method for producing a heating rod, said method comprising the following steps:
arranging at least one ceramic PTC element and at least one contact element in a flat housing tube formed with an inwardly curved sidewall which bears against an insulation layer and inwardly curved narrow sides, wherein the housing tube is formed from sheet metal and is open along a longitudinal side, further wherein the contact element is a sheet metal strip, which, via a front face, bears against the ceramic PTC element and, on a rear face, bears against the insulation layer; and
welding portions of the sheet metal that bear against one another by means of a weld seam running in the longitudinal direction of the tube.

12. The method according to claim 11, further comprising closing the open longitudinal side of the housing tube before the step of welding.

* * * * *